June 13, 1967   R. C. BRUMFIELD   3,324,825
GLOW DISCHARGE REACTOR
Filed Nov. 25, 1964   3 Sheets-Sheet 1
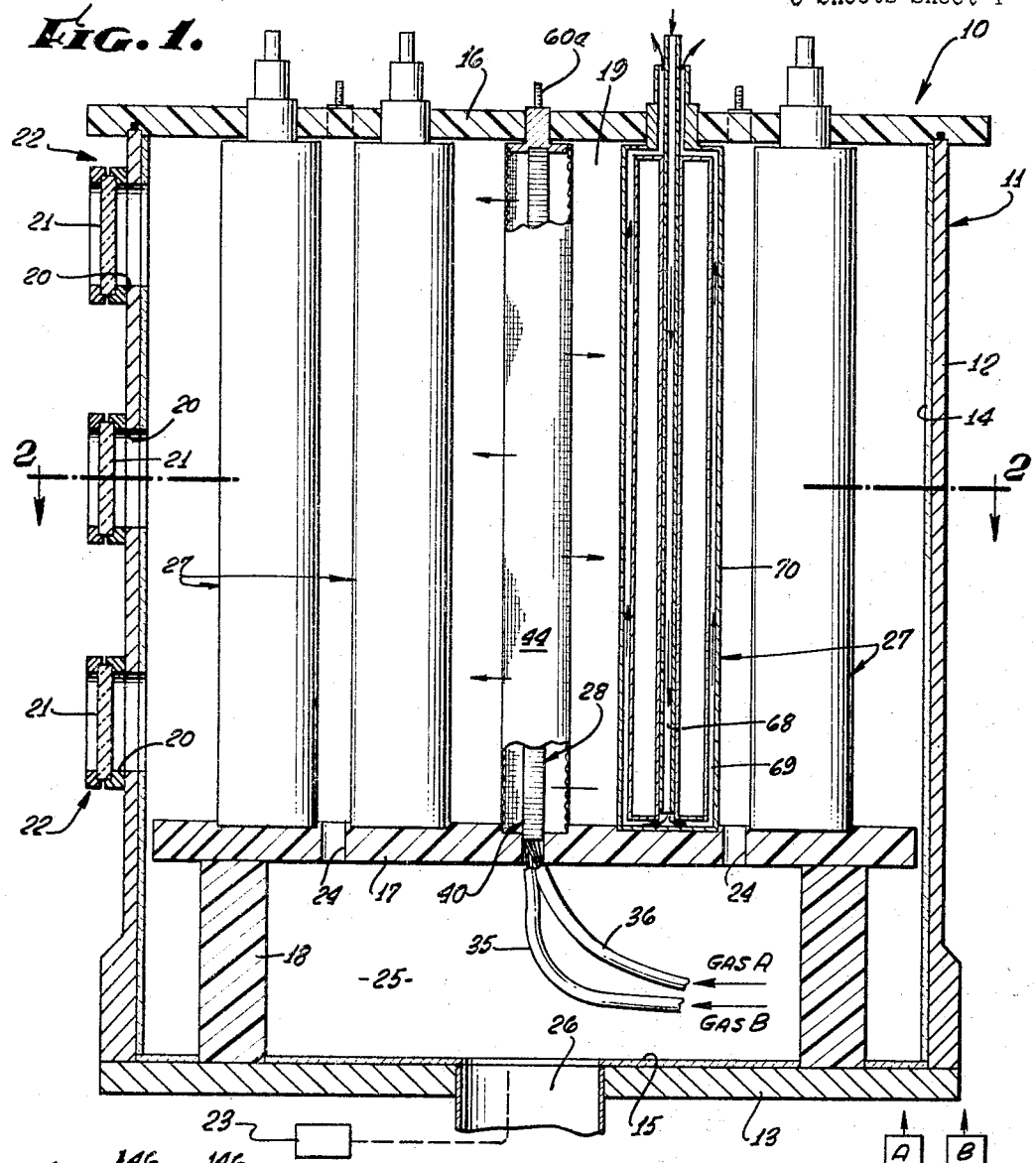
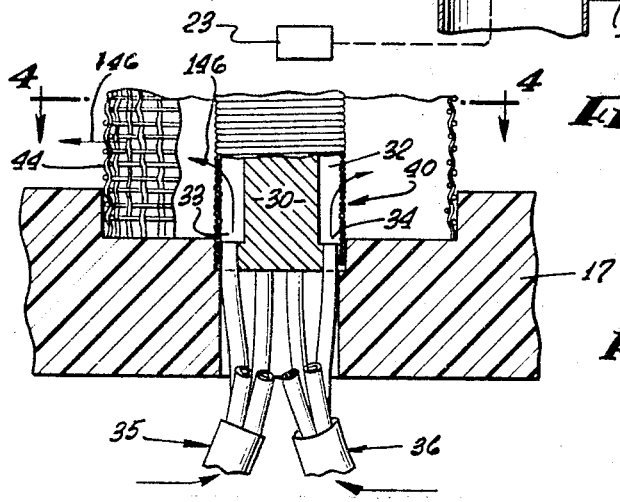
INVENTOR.
ROBERT C. BRUMFIELD
By White & Haefliger
ATTORNEYS.

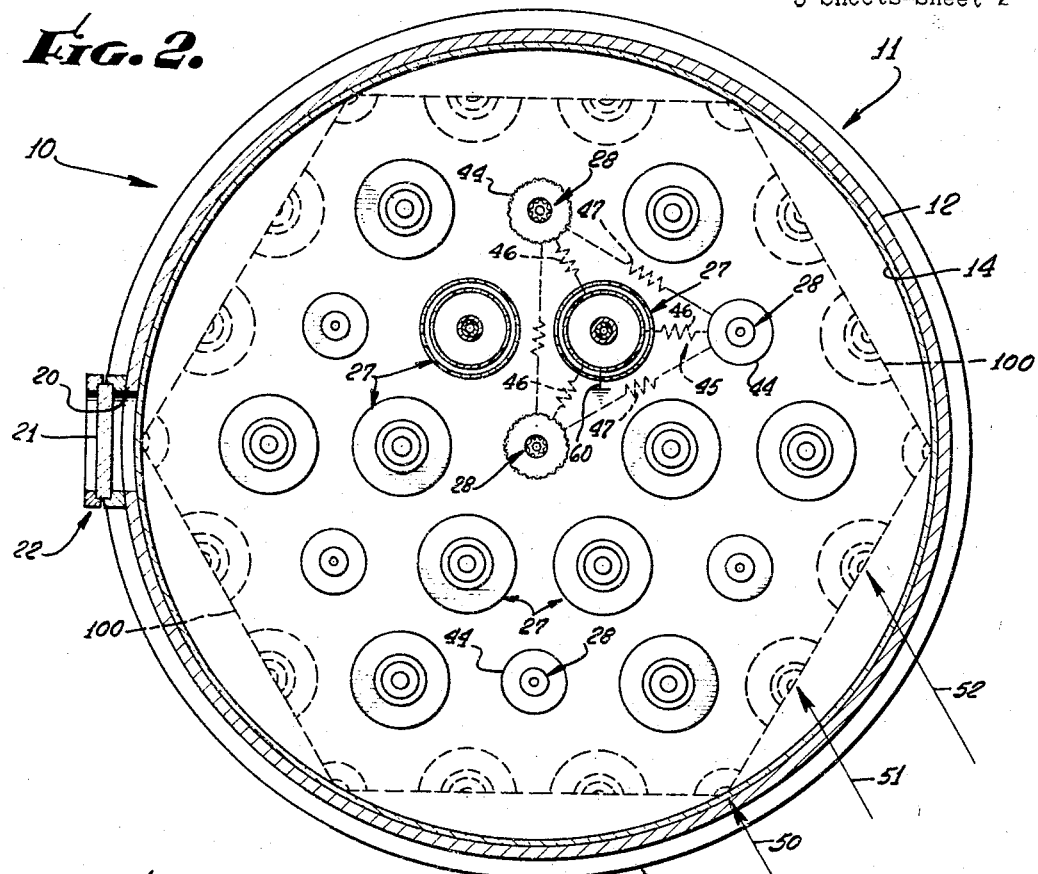

June 13, 1967 R. C. BRUMFIELD 3,324,825
GLOW DISCHARGE REACTOR
Filed Nov. 25, 1964 3 Sheets-Sheet 3
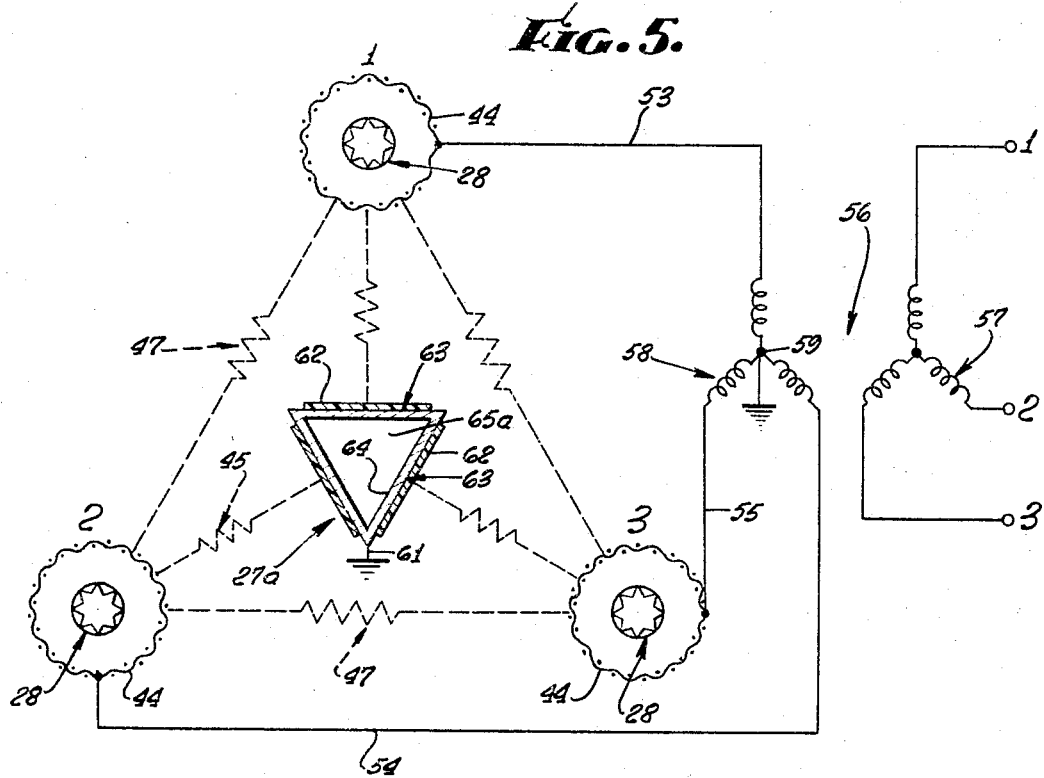
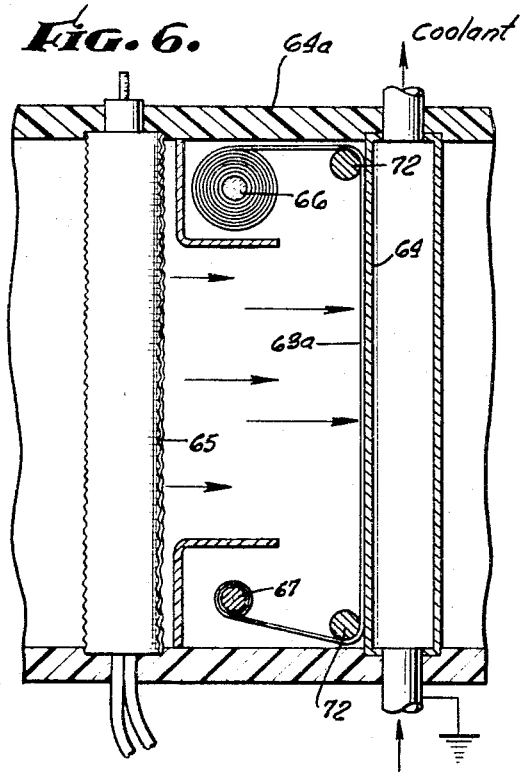
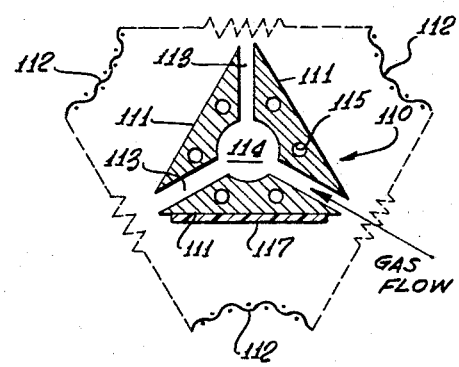
INVENTOR
ROBERT C. BRUMFIELD
By White & Haefliger
ATTORNEYS.

United States Patent Office 3,324,825
Patented June 13, 1967

3,324,825
GLOW DISCHARGE REACTOR
Robert C. Brumfield, Laguna Beach, Calif., assignor to MHD Research, Inc., Newport Beach, Calif., a corporation of Delaware
Filed Nov. 25, 1964, Ser. No. 413,733
22 Claims. (Cl. 118—49.5)

ABSTRACT OF THE DISCLOSURE

The disclosed glow discharge reactor provides maximum active area for product deposition, minimum inactive surface area, symmetry of construction for uniform deposition of reaction product, and is adapted to high production rates of polymerized material.

---

This invention relates generally to glow discharge reactors, and more particularly concerns improvements in the construction and efficiency of operation of such reactors.

As disclosed in U.S. Patent 2,932,591, organic substances, ionized and partially broken up into charged fragments in the plasma of a gaseous discharge, may be caused to move toward and deposit on a surface by means of an electric field, the particles depositing on the surface in the form of a film of polymerized material; however, the apparatus described in that patent is not well adapted to high production rates of the polymerized material.

It is a major object of the present invention to provide a glow discharge reactor characterized by the provision of highly unusual and advantageous combinations of features and results, as follows: maximum active area for product deposition; minimum inactive area for deposition of waste products; minimum inactive surfaces which might contaminate the reaction or short circuit the glow discharge; adaptation to use with commercial power; symmetry of construction to enhance uniform deposition of the reaction product; the incorporation of passages for the glow discharge current to by-pass the deposition surfaces; prismatic form of monomer injectors and polymer collectors to provide for access to the glow discharge chamber interior from its ends, and also to provide for extensibility to allow for increasing the reactor size as by adding injectors and collectors in established array pattern.

In keeping with the above object, the novel glow discharge reactor basically comprises a chamber, means projecting in the chamber defining a collector for receiving organic material in deposited form, at least three injectors located in an array with respect to the collector for injecting organic material to travel in vapor state along paths in the chamber for deposition on the collector, separate electrically conductive grids located in said paths, and means to supply alternating current to the grids in out of phase relation, thereby to establish a glow discharge in said paths. More specifically, alternating current is typically supplied to the grids in rotating phase relation with respect to the collector, the latter being electrically grounded, whereby current paths may be established between the screens spaced about the collector and in close by-passing relation to the collector.

Further in keeping with the above object, multiple collectors and injectors are typically located in the chamber to form an array having such symmetry that at least three injectors are spaced about each collector located interiorly of the chamber. The array is typically such as to form parallel rows of grids about the injectors, the grids in each row being connectible to one output lead of a multiple phase alternating current supply system, thereby to define repeated groups of grid rows in which each group is associated with the multiple leads of the system. Accordingly, the reactor is well adapted to use with commercal power systems, irrespective of the size of the reactor as established by the number of groups of like rows of grids. Typically, the array of collectors and injectors may be hexagonal or rectangular, as will appear.

Additional objects of the invention include the provision of means to supply coolant to flow in heat transfer relation to the collectors; forming of the collectors and injectors to extend in axially elongated generally parallel relation; forming of the injectors to have body passages for flowing reactive gas and organic material in vapor state along and then away from the injector bodies and toward the collectors to mix and react in the glow dicharge zones; and the provision for depositing the organic polymer on multiple movable collector strips facing the injectors.

These and other objects and advantages of the invention, as well as the details of illustrative embodiments, will be more fully understood from the following detailed description of the drawings in which:

FIG. 1 is a vertical section taken through a typical reactor;

FIG. 2 is a horizontal section taken on line 2—2 of FIG. 1;

FIG. 3 is an enlarged fragmentary view showing the typical construction of an injector and grid;

FIG. 4 is a section taken on line 4—4 of FIG. 3;

FIG. 5 shows the construction of a typical array that includes a collector and three grid surrounded injectors;

FIGS. 6, 7 and 8 show modified reactors.

Referring first to FIG. 1, the reactor 10 comprises a chamber 11 having metallic side and bottom walls 12 and 13 with vitreous or glass interior linings 14 and 15, and a removable insulative top wall 16, the latter typically comprising glass. A horizontal support plate 17 is carried in the chamber as by an annular ring 18, the latter and plate 17 typically comprising an insulative material such as a refractory. Wall 12 bounding the chamber interior 19 typically contains viewing ports 20 covered by glass windows 21 mounted on sealing rings 22 carried by the wall. The chamber interior 19 is subject to controlled evacuation as by operation of a vacuum pump 23 withdrawing gas through vacuum ports 24 in plate 17, the sub-chamber 25 below plate 17, and the outlet 26 therefrom leading to the pump.

The chamber contains what may be referred to as first means projecting within interior 19 and defining a collector for receiving organic material in deposited form, as well as at least three injectors located in an array with respect to the collector for injecting organic material to travel in vapor state along paths in the chamber for deposition on the collector. As an example of such structure, the description is extended to FIG. 2 wherein certain collectors 27 share certain injectors 28, all within the chamber interior, in such manner that three injectors are equally spaced about a collector, the general overall pattern of collectors and injectors being hexagonal. Broken line 100 passing through broken line injectors and collectors shows the mode of expansion of the system size.

Referring to FIGS. 3 and 4, the injectors may comprise axially elongated bodies 30 each of which is axially ribbed or fluted at 32 and forms alternate passages 33 and 34. Manifolding 35 supplies a gas A to passages 33, whereas manifolding 36 supplies gas B to passages 34, and as will appear gas A may consist of organic monomer in vapor state, such as is described in U.S. Patent 2,932,591, or vaporous ceresin. While provision is made for supply of gas B, it may or may not be used, depending upon the desired reaction with gas A in the glow discharge zone, as will be described. Gas B may, for example, consist of air supplied as needed to maintain the desired pressure in the chamber interior and also to react with gas A. Suitable flow regulating sources of gases A and B are indicated at 37 and 38 in FIG. 1.

The injectors also include perforated structure to confine the gases in the separate passages 33 and 34 to flow along and lengthwise of the bodies 30, and also to pass the gases leaving said passages. As an example, the perforated structure may comprise a wire winding 40 about and along the fluted body 30 forming slight perforations or approximately annular clearances between adjacent windings to pass the gases filling the passages 33 and 34. This type winding facilitates the mixing of the gases A and B as will now be described. It will be noted that passages 33 and 34 are separated and the sides thereof as defined by the flutes 32 are angled to discharge gases A and B in separate streams 41 and 42 respectively, along the length of the body 30, inducing overlapping and mixing of the gases in zones 43 before arrival of the mixture at grids 44. This process promotes the reaction of the gases in the glow discharge zones 45 between the grids 44 and the collectors, as better seen in FIG. 2.

Generally speaking, the grids are contemplated by the invention to be separated, electrically conductive, and located in the paths of travel of the gases A and B toward the collectors 27. The illustrated examples of such grids having unusual utility in the array comprise cylindrical meshes surrounding the injectors spaced therefrom to enable pre-mixing of the gases A and B before their outward passage through the grids as indicated by path arrows 146 in FIG. 4.

The invention also contemplates the provision of means for supplying alternating current to the grids in out-of-phase relation, thereby to establish a glow discharge in the paths of travel of the gases toward the collectors, and particularly in zones 45. The latter are schematically illustrated by electrical resistances 46 between grids 44 and the collector 27, and by electrical resistances 47 between the differential phase energized grids 44 themselves. In this regard, the resistances 46 and 47 represent the resistance to current flow established in the plasma or ionized media in the unobstructed space between the array elements, and it will be noted that provision is made for glow discharge current flow in by-passing relation to the deposition surfaces of the collectors, as indcated by the schematic resistors 47.

The aforementioned means typically effects supply of alternating current to the grids in rotating phase relation with respect to a collector. For example, the grids may be arranged in groups or banks of three rows each as indicated at 50, 51 and 52 in FIG. 2, and a commercial three phase power supply system may have three leads respectively connected with the grids in the three successive rows. The connections are such as to have repeated order, i.e. lead 1 associated with zero phase angle is connected to grids in rows 50, lead 2 associated with 120 degree phase angle is connected to grids in rows 51, and lead 3 associated with 240 degree phase angle is connected to grids in rows 52. Accordingly, the three grids 44 about any collector 27 are at any given instant respectively supplied with out-of-phase current having zero, 120 and 240 degree relation, which rotates with respect to that collector in view of the alternation of the current supplied to each grid. In this regard, FIG. 5 shows a modified collector 27a with three injectors 28 spaced thereabout at 120 degree intervals. The three cylindrical grids 44 surrounding the injectors are respectively supplied via leads 53, 54 and 55 with three phase power. A transformer is seen at 56 to have Y-connected primary windings 57 and Y-connected secondary windings 58 respectively connected to the leads 53–55. The ratio of the primary to secondary turns in the transformer may be chosen to supply the high voltage, i.e. 1000 to 2000 volts at the secondary for supply to the grids. The neutral point 59 of the secondary windings may be grounded, as well as the collector 27 as indicated at 60 in FIG. 2 and 61 in FIG. 5. FIG. 1 shows a typical grid 44 as having a terminal connection 60 to which a current lead may be connected above the top wall 16.

The collector 27 is typically generally prismatic in form to present collection surfacing to the multiple injectors spaced thereabout. Thus the collectors 27 in FIGS. 1 and 2 have cylindrical outer surfaces 70, whereas the modified collector 27a in FIG. 5 has three outer surfaces 62 defined by multiple strips 63. The latter may comprise glass and be affixed to the grounded body 64 of the collector, or they may comprise conductive or non-conductive tape subject to transport lengthwise of the three-sided body 64. In regard to such transport, FIG. 6 shows a modified reactor wherein means is provided for traveling the strips 63a generally axially in the chamber 64, while the strips face the injectors surrounded by grids 65 to receive deposition of polymer thereon. Suitably powered tape supply and winding reels are indicated at 66 and 67 with tape turning spools at 72. At suitable intervals, the reactor is opened up and the tapes withdrawn from the winding reels in order to recover deposited polymer therefrom, or to enable transportation of the tape for remote handling or processing, or storage, or usage of the wound tapes with the polymer remaining thereon.

Finally, the collectors may be suitably cooled, if desired, by passing a collant into hollows provided therein. In FIG. 1, the collector 27 contains a central duct or passage 68 and an outer annular passage 69 to circulate coolant into heat transfer relation to the polymer collection surface 70. In FIG. 5, the collector body 64 contains a central hollow or passage 65 to pass the coolant, and the tape 63a is held in good sliding and heat transfer contact with the cooled surface of grounded body 64 by electrical or electrostatic force.

FIG. 7 illustrates a reactor 79 containing a square or rectangular array of gas and monomer sources 80 and polymer collectors 81. Grids about the sources or injectors are indicated at 82, and the array is surrounded by a reactor wall 83. The four legs of a four phase alternating current supply may be connected to the grids 82, as schematically indicated at 84–87, the legs being outside the reactor.

The lengths of the injectors and collectors as referred to herein may be made very much greater than their individual cross dimensions in order to greatly reduce wastage of polymer depositing on the reactor walls, particularly the walls at which the injectors and collectors terminate.

As the number of injectors and collectors as referred to herein is increased by expansion of the reactor size, the size of the reactor side wall, as for example wall 12 in FIG. 1, becomes relatively smaller in relation to the effective reaction volume of the reactor, whereby wastage of the injected organic material as by deposition on the side wall becomes less significant.

FIG. 8 shows a cross section through a modified collector body 110 having three outer sides 111 facing three grids 112 associated with injectors, not shown. Body 110 contains gas inlet porting 113 at the body corners past which electrical current may flow between the grids in by-passing relation to the collector, as described above in FIG. 5. Porting 113 communicates with central porting 114 formed within and axially of the collector body, and leading to a vacuum pump, as in FIG. 1. Coolant passages 115 also run interiorly of body 110 to pass fluid in cooling relation to body outer sides 111. Tape 117 may be run lengthwise along one or more of such sides, as indicated.

I claim:

1. In a glow discharge reactor, a chamber, first means projecting in the chamber defining a collector for receiving organic material in deposited form, at least three injectors located in an array with respect to said collector for injecting organic material to travel in vapor state along separate paths in the chamber for deposition on the collector, separate electrically conductive grids located in said separate paths, and means to supply alternating current to said grids in out of phase relation thereby to establish a glow discharge in said paths.

2. In a glow discharge reactor, a chamber, first means projecting in the chamber defining a collector for receiving organic material in deposited form, at least three injectors located in an array with respect to said collector for injecting organic material to travel in vapor state along separate paths in the chamber for deposition on the collector, separate electrically conductive grids located in said separate paths, means to supply alternating current to said grids in rotating phase relation with respect to said collector thereby to establish a glow discharge in said paths, and means electrically grounding said collector.

3. The combination as defined in claim 2 including means to supply coolant to flow in heat transfer relation to said collector.

4. The combination of claim 2 in which said collector and said injectors are axially elongated in generally parallel relation.

5. The combination of claim 4 in which each of said injectors comprises a body forming passages to flow gas and said organic material in vapor state along and then away from said body and toward said collector to mix and react after leaving said body.

6. The combination of claim 4 in which said body is axially fluted and said injector includes perforated structure to confine the gas and said vaporous organic material to flow along said body in passages formed by said flutes, and to pass the gas and organic material leaving said passages.

7. The combination of claim 5 in which the passages are separated and angled to flow the gas and organic material in separate streams lengthwise of the body and to induce mixing of the gas and arrival thereof at said grid.

8. The combination of claim 2 in which said collector has multiple surfaces facing said injectors to receive deposition of said material.

9. The combination of claim 2 including means for reducing the gaseous pressure in said chamber to near vacuum condition.

10. The combination of claim 4 in which said collector comprises multiple strips, and including means for traveling said strips generally axially in the chamber while facing said injectors.

11. In a glow discharge reactor, multiple collectors projecting in the chamber and in spaced apart relation for receiving organic material in deposited form, multiple injectors projecting in the chamber, the collectors and injectors forming a symmetric array in which a least three injectors are spaced about each collector located interiorly of the chamber for injecting organic material to travel in vapor state along paths in the chamber leading to the collectors for deposition thereon, electrically conductive grids disposed about said injectors, and means to supply alternating current to said grids in rotating phase relation with respect to each collector thereby to establish a glow discharge in said paths.

12. The combination of claim 11 including means to electrically ground said collectors.

13. The combination of claim 11 in which three injectors are spaced about each collector, and said current supply means includes a three phase system having three leads respectively connected with grids in three successive rows.

14. The combination of claim 11 including means to supply coolant in heat transfer relation to said collectors.

15. The combination of claim 11 in which said injectors and collectors are axially elongated in generally parallel relation.

16. The combination of claim 15 in which each of said injectors comprises a body forming passages to flow gas and said organic material in vapor state along and then away from said body and toward collectors spaced thereabout to mix and react after leaving said body.

17. The combination of claim 11 in which each collector has multiple surfaces facing said injectors to receive deposition of said material.

18. The combination of claim 11 in which said collector has three sides each of which faces an injector.

19. The combination of claim 11 in which said collector has four sides each of which faces an injector.

20. The combination of claim 3 in which said gaseous pressure reducing means includes porting extending in said chamber and lengthwise of said collector.

21. The combination of claim 20 in which said porting is formed by said first means at said collector.

22. The combination of claim 11 in which successive grids about each injector are openly spaced apart to provide an unobstructed path for current flow therebetween, in by-passing relation to the collector.

No references cited.

MORRIS KAPLAN, *Primary Examiner.*